(12) United States Patent
Lawrence

(10) Patent No.: US 7,760,136 B2
(45) Date of Patent: Jul. 20, 2010

(54) MODULAR MULTI-FREQUENCY GNSS RECEIVER

(75) Inventor: David G. Lawrence, Santa Clara, CA (US)

(73) Assignee: Novariant, Inc., Fremont, CA (US)

( * ) Notice: Subject to any disclaimer, the term of this patent is extended or adjusted under 35 U.S.C. 154(b) by 923 days.

(21) Appl. No.: 11/499,826

(22) Filed: Aug. 4, 2006

(65) Prior Publication Data

US 2010/0141513 A1    Jun. 10, 2010

(51) Int. Cl.
*G01S 1/00* (2006.01)

(52) U.S. Cl. .............................. 342/357.06; 342/357.12
(58) Field of Classification Search ............ 342/357.06, 342/357.12
See application file for complete search history.

(56) References Cited

U.S. PATENT DOCUMENTS

| 6,449,558 | B1 | 9/2002 | Small | |
|---|---|---|---|---|
| 2005/0242990 | A1* | 11/2005 | Lawrence et al. | 342/357.12 |
| 2006/0022869 | A1 | 2/2006 | Zimmerman et al. | |
| 2006/0022870 | A1 | 2/2006 | Zimmerman et al. | |
| 2006/0022871 | A1 | 2/2006 | Zimmerman | |
| 2006/0022872 | A1 | 2/2006 | Zimmerman | |
| 2006/0022873 | A1 | 2/2006 | Zimmerman | |
| 2006/0227905 | A1* | 10/2006 | Kunysz et al. | 375/345 |
| 2007/0075896 | A1* | 4/2007 | Whitehead et al. | 342/357.11 |
| 2007/0230268 | A1* | 10/2007 | Hoogeveen et al. | 367/19 |

FOREIGN PATENT DOCUMENTS

| WO | WO 99/63358 | 5/1999 |
|---|---|---|
| WO | WO 2005/012935 | 2/2005 |

OTHER PUBLICATIONS

Barnes, J., et al., "High Precision Indoor and Outdoor Positioning using LocataNet," School of Surveying and Spatial Information Systems, The University of New South Wales, Australia (UNSW).

Barnes, J., et al., "Locate: a New Positioning Technology for High Precision Indoor and Outdoor Positioning," School of Surveying and Spatial Information Systems, The University of New South Wales, Australia (UNSW).

Barnes, J., et al., "*LocataNet*: Intelligent time-synchronised pseudolite transceivers for cm-level stand-alone positioning," Satellite Navigation and Positioning (SNAP) Group, School of Surveying and Spatial Information Systems, The University of New South Wales, Australia (UNSW).

(Continued)

*Primary Examiner*—Thomas H Tarcza
*Assistant Examiner*—Harry Liu
(74) *Attorney, Agent, or Firm*—Perkins Coie LLP

(57) ABSTRACT

A method and system for leveraging available navigation frequencies for determining position by creating a flexible navigation signal architecture is disclosed. Such an architecture is designed for customizing a navigation system by combining, adding, replacing or removing one or more removable RF section modules. At least one of the RF section modules has a mutually complementary frequency set with respect to a frequency set of one or more of the other RF section modules in the system.

96 Claims, 6 Drawing Sheets

OTHER PUBLICATIONS

LeMaster, E.Al, "Self-Calibrating Pseudolite Arrays: Theory and Experiment," A dissertation submitted to the Department of Aeronautics and Astronautics (May 2002).

Matsuoka, M., "Mars Rover Navigation Using Pseudolite Transceiver Arrays: Network-Based Ranging and Extended Self-Calibration Algorithm," A dissertation submitted to the Department of Aeronautics and Astronautics (Mar. 2005).

Trimbel News Release, entitled "Trimble Introduces New Surveying Products for the Connected Survey Site," (Oct. 2005).

U.S. Appl. No. 10/909,140, filed Jul. 30, 2004, Bauregger et al.

U.S. Appl. No. 10/909,184, filed Jul. 30, 2004, Zimmerman et al.

U.S. Appl. No. 10/909,243, filed Jul. 30, 2004, Zimmerman et al.

* cited by examiner

MODULAR MULTI-FREQUENCY GNSS RECEIVER

CROSS-REFERENCE TO RELATED APPLICATION

The present application is related to the concurrently filed application entitled, ANTENNA COMBINATION TECHNIQUE FOR MULTI-FREQUENCY RECEPTION, U.S. application Ser. No. 11/499,544, filed on Aug. 4, 2006, by inventors, Paul Montgomery and David Lawrence, the entire contents of which are hereby incorporated by reference as if fully set forth herein.

TECHNICAL FIELD

The present invention is directed to precise local positioning systems, and more specifically to the design of multi-frequency Global Navigation Satellite System receivers.

BACKGROUND

Global positioning satellites are on track to offer new frequencies, such as unencrypted L2 and L5 signals for use in global positioning applications. Future Global Navigation Satellite System (GNSS) constellations are expected to offer more frequencies than are available from present day GPS constellations. For example, Galileo will offer signals at 1278.75 MHz and 1207.14 MHz.

In general, the more frequencies that a receiver is capable of tracking, the more complex the receiver design. It is more than likely that such receivers will be considerably more expensive than conventional receivers due to their manufacturing complexity and in part due to market forces, such as supply and demand.

Thus, in view of the above problems, there is a need for a method and system for providing multi-frequency capability in a positioning system in a cost effective manner.

SUMMARY OF THE INVENTION

According to one aspect of certain non-limiting embodiments, a plurality of RF section modules is provided in a system for determining position. The RF section modules provide signals that are combined for determining position. At least one of the plurality of RF section modules is designed for convenient removal from the system and has a mutually complementary frequency set with respect to a frequency set of one or more of the other RF section modules in the system.

According to another aspect of certain non-limiting embodiments, available navigation frequencies for determining position can be leveraged by creating a flexible navigation signal architecture. Such an architecture is designed for customizing a navigation system by combining, adding, replacing or removing one or more removable RF section modules. At least one of the RF section modules has a mutually complementary frequency set with respect to a frequency set of one or more of the other RF section modules in the system.

DETAILED DESCRIPTION

Figure 1A:
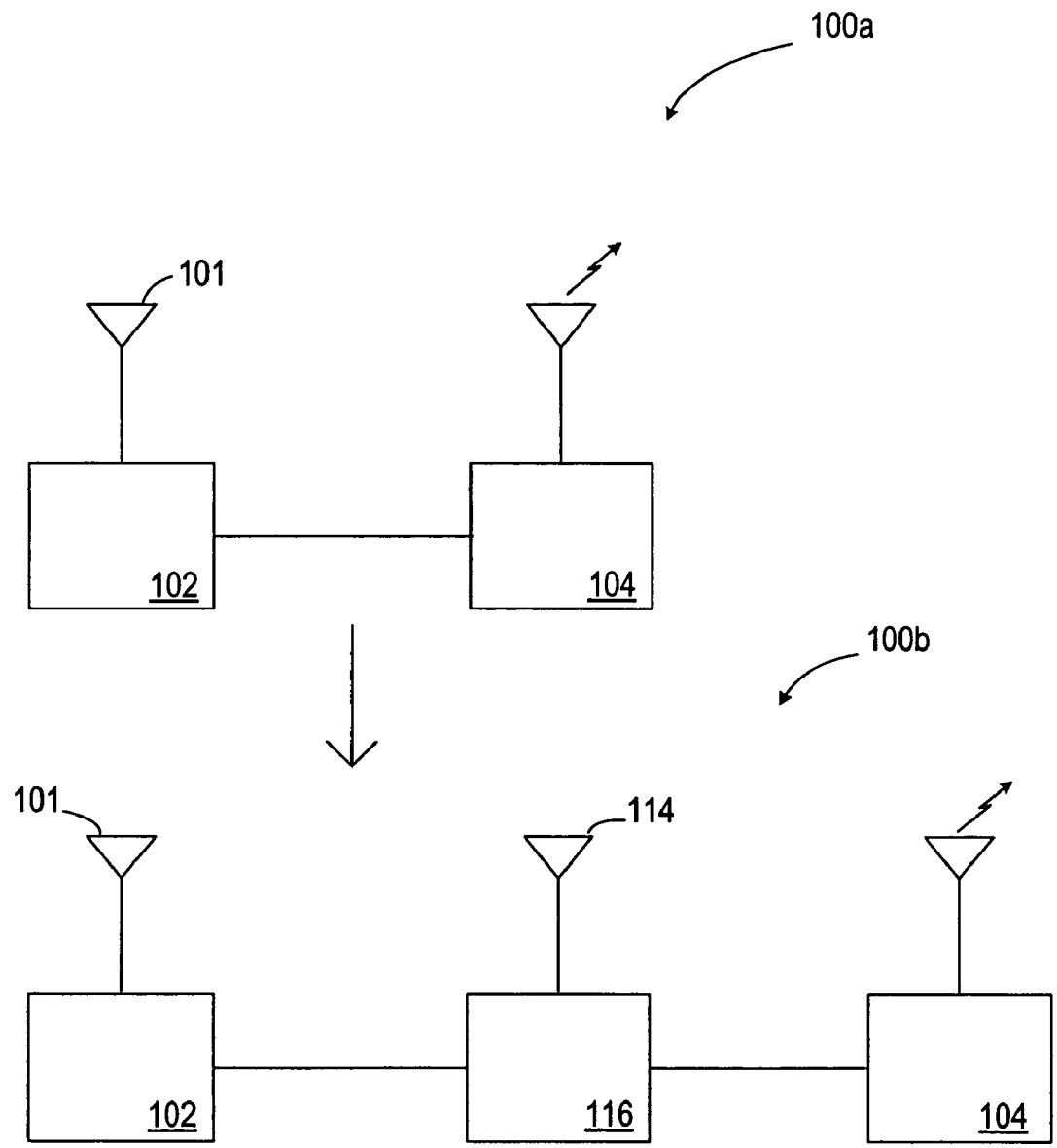
FIG. 1A is a high-level block diagram that illustrates an upgrade of a single frequency base station to a multi-frequency base station, according to certain embodiments.

FIG. 1A is a high-level block diagram that illustrates an upgrade of a single frequency base station to a multi-frequency base station, according to certain embodiments. FIG. 1A shows a base station system 100a that can be upgraded to system 100b. System 100a comprises a single frequency radio frequency receiver 102 with a single-frequency antenna 101. Receiver 102 is serially connected to a radio modem 104. The radio modem is used to broadcast differential correction data to rovers.

System 100a can be upgraded to a corresponding system 100b by adding another single frequency Radio Frequency (RF) section module 116 that is capable of receiving a frequency that is different from that of single frequency receiver 102. In other words, RF section module 116 has a mutually complementary frequency with respect to RF section module 102.

A first RF section module is said to have a mutually complementary set with respect to a second RF section module or receiver if the first RF section module can receive signals in at least one frequency that the second RF section module or receiver in the system is incapable of receiving and vice versa. According to certain embodiments, the complementary frequency set consists of one or more frequencies selected from a set of frequencies that can be provided by global positioning constellations, such as Galileo and GPS constellations. Such constellations are expected to offer more frequencies than are available at the present day. The embodiments are not limited to single frequency RF section modules.

Returning to FIG. 1A, system 100b comprises single frequency RF section module 116 with a corresponding RF section, correlator and processor (not shown in FIG. 1A) and a single frequency antenna 114. RF section module 116 is serially connected to single frequency receiver 102 and radio modem 104. Single frequency RF section module 116 intercepts the serial connection between single frequency receiver 102 and radio modem 104. The phase measurements from receiver 102 and single frequency receiver 116 are combined for determining a position solution.

Figure 3:
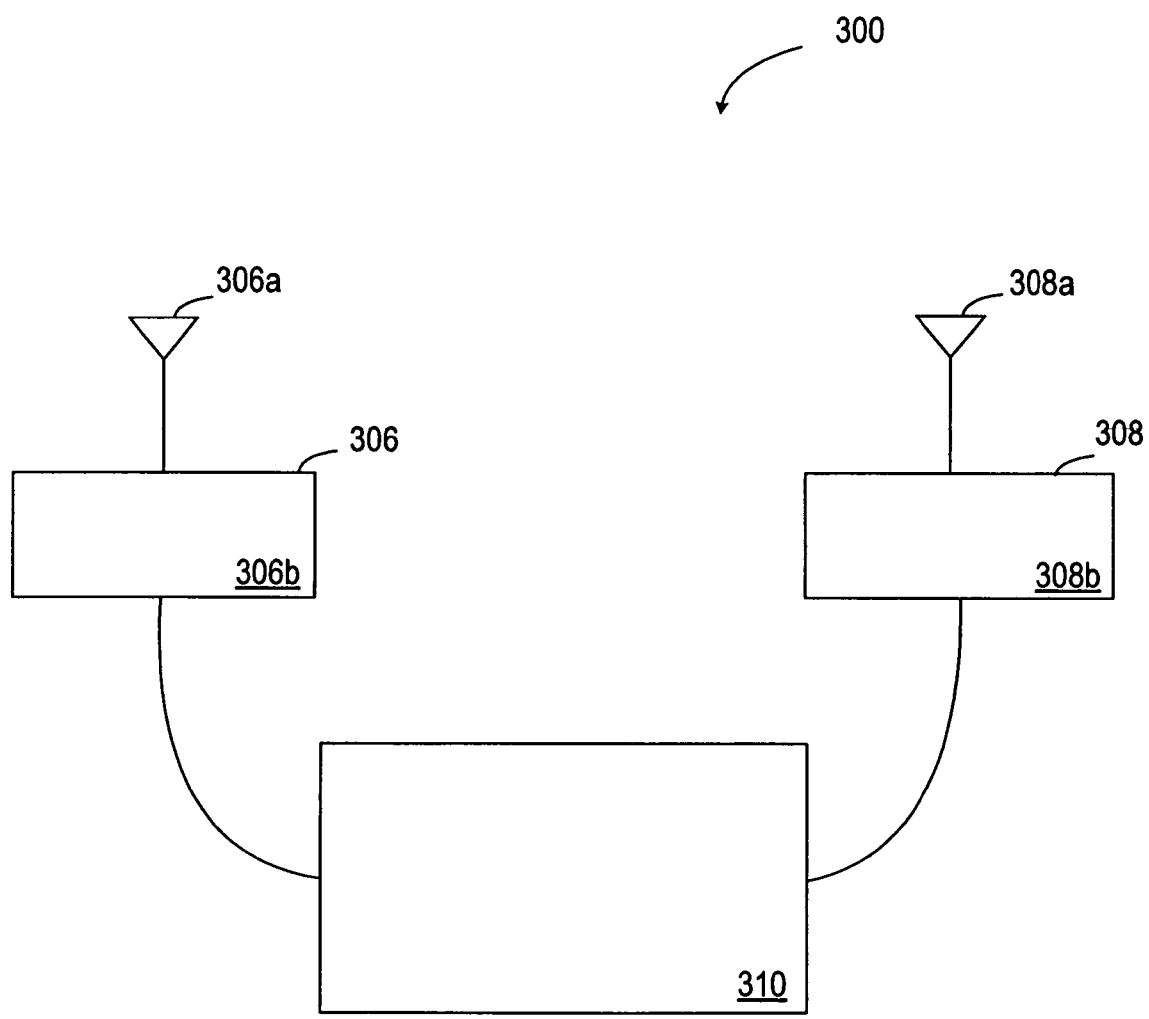
FIG. 3 is a high-level block diagram that illustrates a systems architecture with simplified RF section modules in relation to components for sampling down-converted data, for correlation of sampled data and for processing of correlated data, according to certain embodiments.

According to certain embodiments, an RF section module is a simple device that comprises an RF section, as described in greater detail herein with reference to FIG. 3. According to certain other embodiments, an RF section module includes an RF section, an Analog-to-Digital converter (ND), and a correlator for correlating data. Such an RF section module is described in greater detail herein with reference to FIG. 4. According to certain embodiments, an RF section module includes an RF section, an Analog-to-Digital converter (ND), a correlator for correlating data, as well as a low-level central processing unit (CPU). Such an RF section module is described in greater detail herein with reference to FIG. 5. Further, an RF section module is a modular unit or a modular set of components that is designed to be easily removed from a system or added to a system, according to certain embodiments. The modular unit or modular set of components may or may not include a hardware enclosure for encapsulating the components of the RF section module.

With reference to FIG. 1A, for purposes of explanation, assume that the single frequency receiver 102 is an L1-only receiver and that the single frequency RF section module 116 is an L5-only RF section. Single frequency RF section module 116 combines the L1 correction information from single frequency receiver 102 with L5 measurements to generate L1/L5 correction data, preferably in a standard L1/L5 correction message, according to certain non-limiting embodiments. The L1/L5 correction data is sent to radio modem 104. Radio modem 104 can then broadcast the L1/L5 correction data to rovers in the system.

According to certain embodiments, a correction to account for the offset between the antenna phase center of antenna 101 and that of antenna 114 can be applied either by rovers or the base station. If the rovers are to apply the antenna offset correction, then the offset information between the antenna phase center of antennas is supplied to the rovers.

There are various non-limiting techniques for correcting antenna phase center offsets. Such non-limiting techniques may vary from implementation to implementation. For example, the antennas of the RF section modules can be mounted on a single ground plane, and where the ground plane is in a known orientation. As another example, an independent L1/L5 system is used to calibrate the antenna phase center offsets between antenna 101 and antenna 114 as a one-time set-up procedure.

Figure 1B:
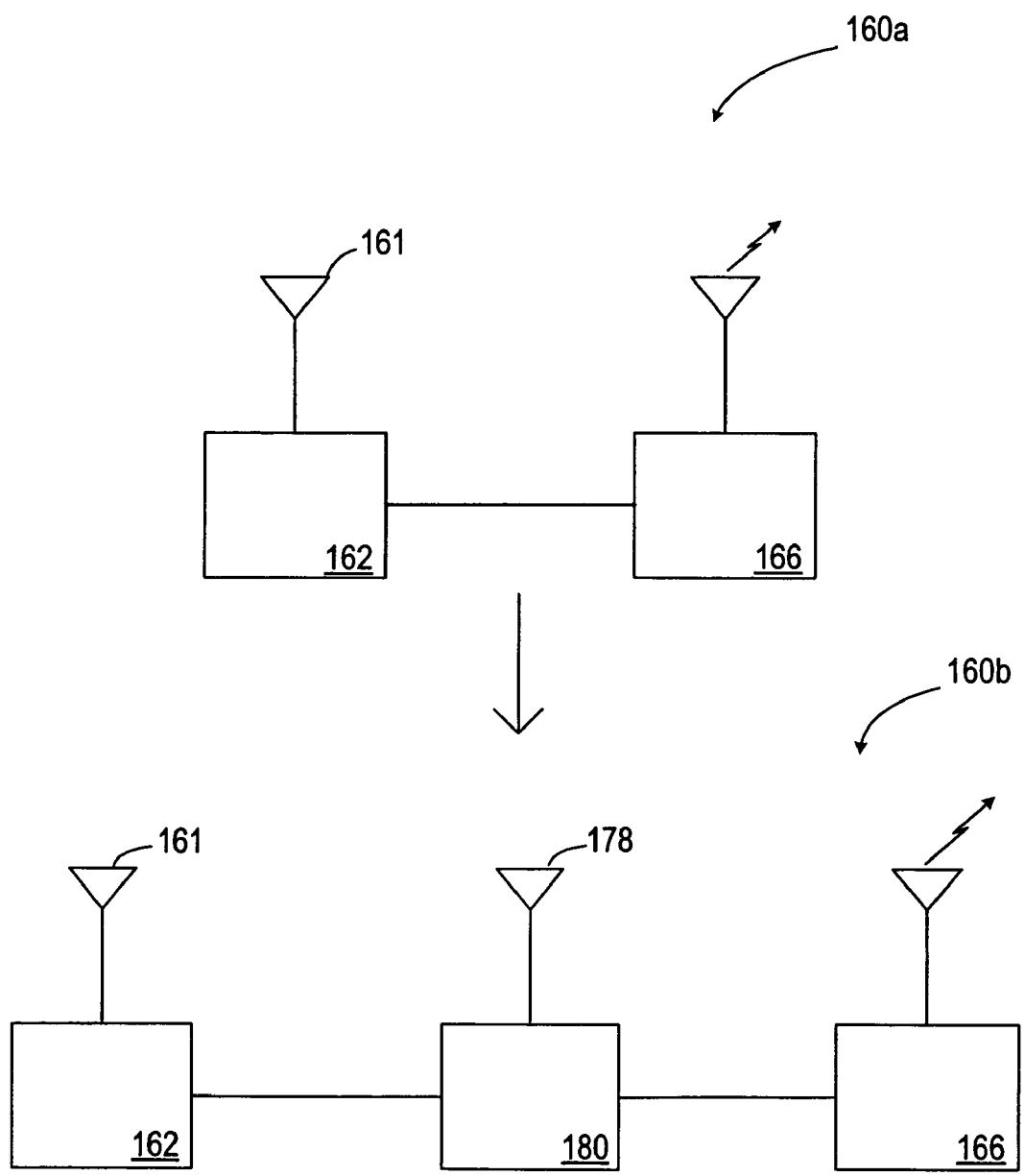
FIG. 1B is a high-level block diagram that illustrates an upgrade of a dual frequency base station to a three-frequency base station, according to certain embodiments.

FIG. 1B is a high-level block diagram that illustrates an upgrade of a dual frequency base station to a three-frequency base station, according to certain embodiments. In FIG. 1B, system 160a comprises a dual frequency antenna 161 with a dual frequency receiver 162 that is serially connected to a radio modem 166. The radio modem is used to broadcast differential correction data to rovers. System 160a can be upgraded by adding either a single or dual frequency RF section module 180 with corresponding correlator and processor (not shown in FIG. 1B) and with antenna 178 that is capable of receiving a frequency that is different from at least one frequency of receiver 162. RF section module 180 intercepts the serial connection between receiver 162 and radio modem 166.

To illustrate, assume that dual frequency receiver 162 is an L1/L2 receiver and that RF section module 180 has an L1/L5 RF section. RF section module 180 combines the L1/L2 correction information from receiver 162 with L5 measurements to generate L1/L2/L5 correction data. The L1/L2/L5 correction data is sent to radio modem 166 for broadcast to rovers associated with the system. The offset between antenna 161 and antenna 178 can be calibrated by using traditional techniques based on the frequency common to both antennas, such as L1 in the foregoing example.

Figure 2:
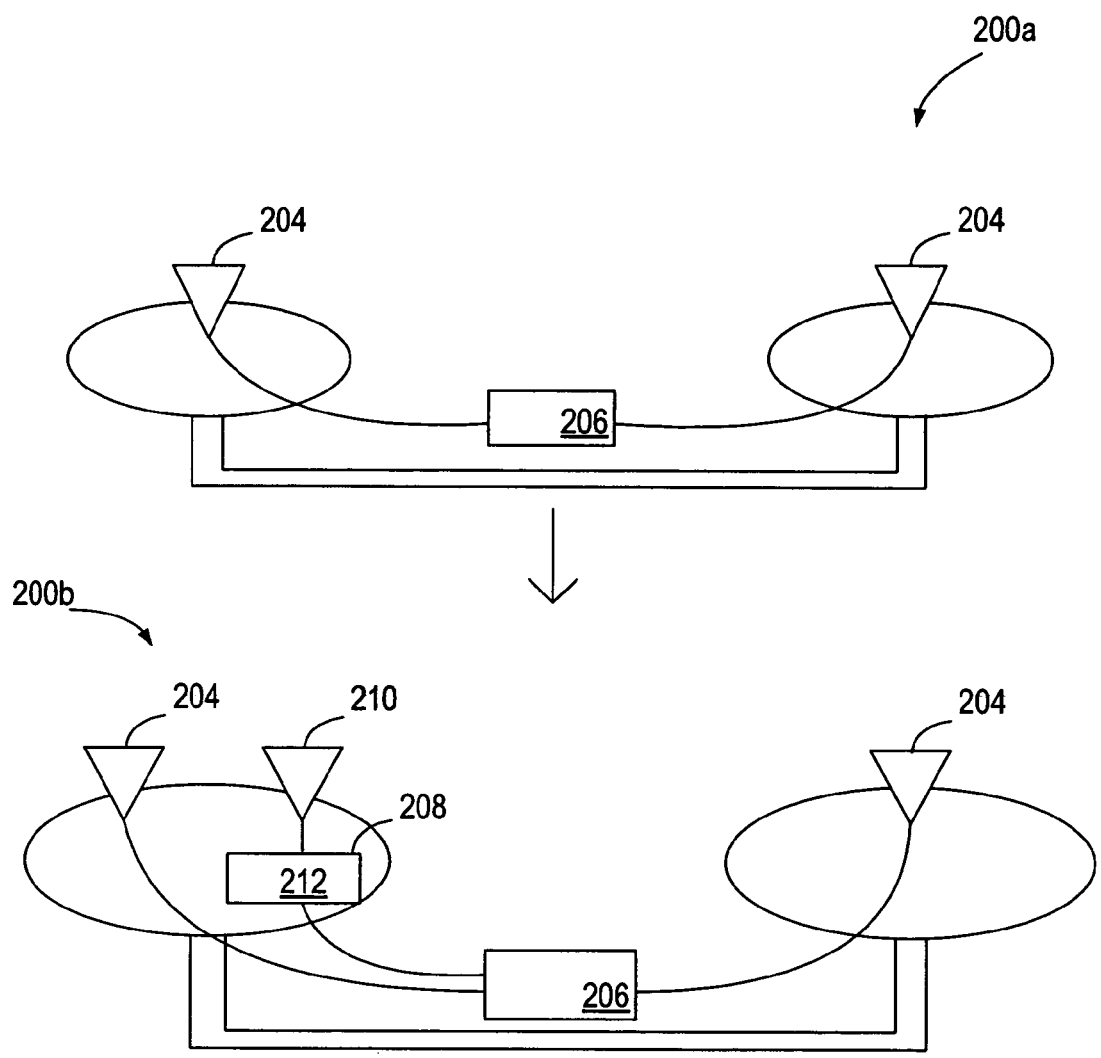
FIG. 2 is a high-level block diagram that illustrates an upgrade of a dual frequency receiver of a rover that is installed on farm equipment to a three-frequency rover, according to certain embodiments.

The embodiments are not limited to the frequencies described with reference to the figures herein. For example, in FIG. 2, the frequencies L1/L2 and L5 are chosen for purposes of explanation. FIG. 2 is a high-level block diagram that illustrates an upgrade of a dual frequency receiver of a rover that is installed on farm equipment to a three-frequency rover, according to certain embodiments.

In FIG. 2, existing position-determining equipment 200a, such as a farm tractor steering system, comprises a roof array that includes two L1/L2 antennas 204, and an L1/L2 receiver 206. Antennas 204 are on ground planes connected to receiver 206. Equipment 200a can be upgraded to a three-frequency system 200b by adding an RF section module 208 to the array. RF section module 208 includes an RF section 212 and is connected to an L5-only antenna 210. Antenna 210 is added in line with the existing antennas 204. Phase outputs from the L5 RF section 212 are routed to a serial port on the existing L1/L2 receiver 206. The firmware on L1/L2 receiver 206 is upgraded to merge the L5 signals from the RF section module 208 with the L1/L2 signals of receiver 206. The offset between the L5 antenna and the L1/L2 antenna can be accounted for by using known attitude information associated with the system, as an example.

FIG. 3 is a high-level block diagram that illustrates a systems architecture with simplified RF section modules in relation to components for sampling down-converted data, for correlating sampled data and for processing of correlated data, according to certain embodiments. FIG. 3 shows a position determination system 300 comprising RF section modules 306 and 308, each of which are operatively connected to subsystem 310. RF section modules 306 and 308, each includes an RF section (306b, 306b) and a corresponding antenna (306a, 308a). Subsystem 310 includes components for sampling downconverted data received from the RF section modules, components for correlating the sampled data, and components for processing the correlated data, according to certain embodiments. The RF section modules of FIG. 3 have mutually complementary frequency sets relative to each other. For example, RF section module 306 may be capable of receiving L1 signals and RF section module 308 may be capable of receiving L5 signals. For purposes of simplicity, only two RF section modules and one subsystem are shown in FIG. 3. The number of RF section modules and subsystems may vary from implementation to implementation.

Figure 4:
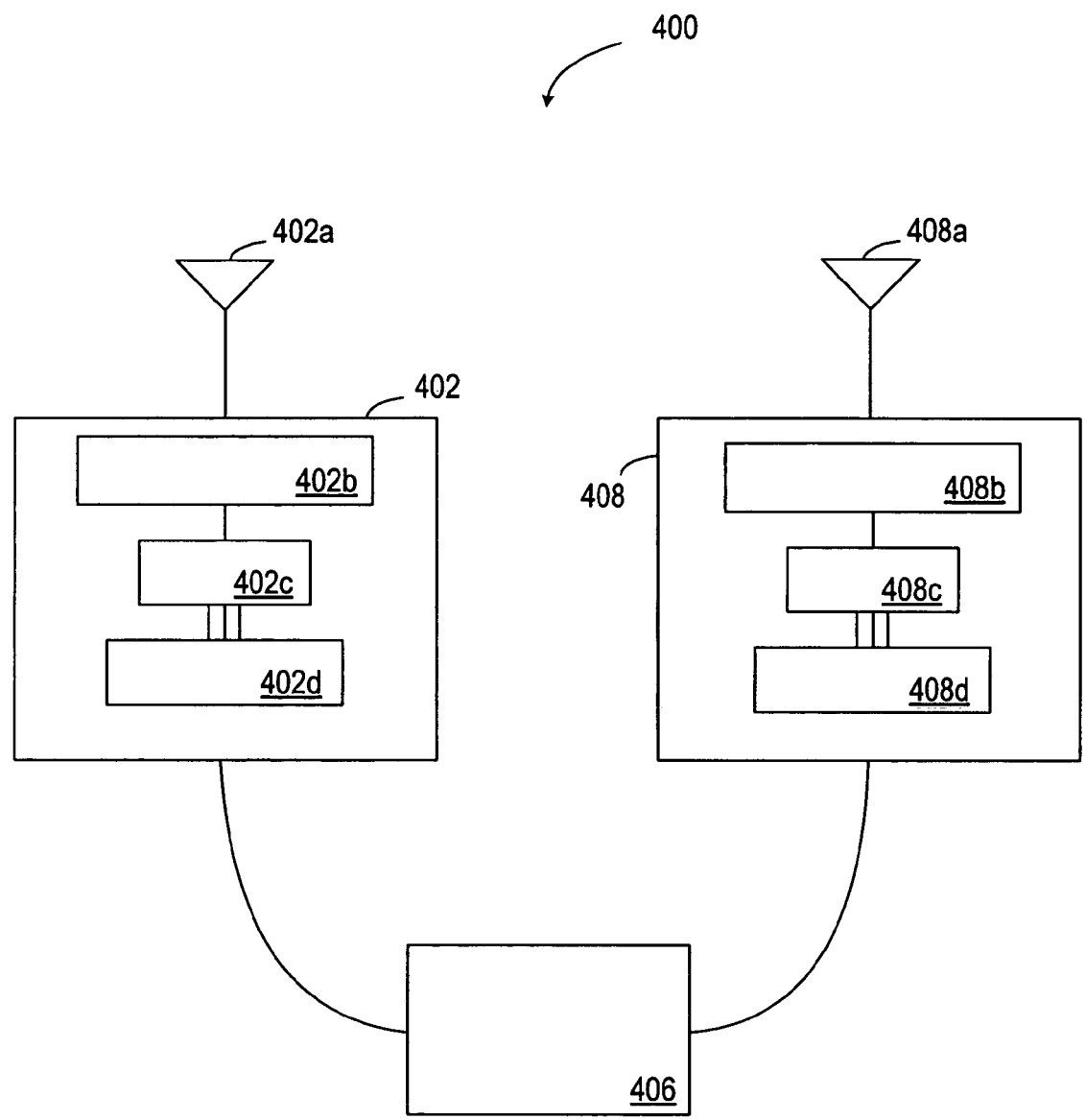
FIG. 4 is a high-level block diagram that illustrates a systems architecture with one type of complex RF section module in relation to a high-level receiver navigation processor, according to certain embodiments.

FIG. 4 is a high-level block diagram that illustrates a systems architecture with one type of complex RF section module in relation to a high-level receiver navigation processor, according to certain embodiments. FIG. 4 shows system 400 that comprises RF section modules 402 and 408, each of which is connected to navigation processor 406. RF section module 402 comprises an antenna 402a, an RF section 402b, an Analog-to-Digital converter (A/D) 402c, and a correlator 402d. Similarly, RF section 408 comprises an antenna 408a, an RF section 408b, an Analog-to-Digital converter (A/D) 408c, and a correlator 408d. The Analog-to-Digital converter (A/D) converts the signals received by the receiver to digital data that is passed to a correlator for correlating data. The correlator output is then passed to the processor, such as processor 406, for processing of the correlated data. For purposes of simplicity, only two RF section modules and one processor are shown in FIG. 4. The number of RF section modules and processors may vary from implementation to implementation.

Figure 5:
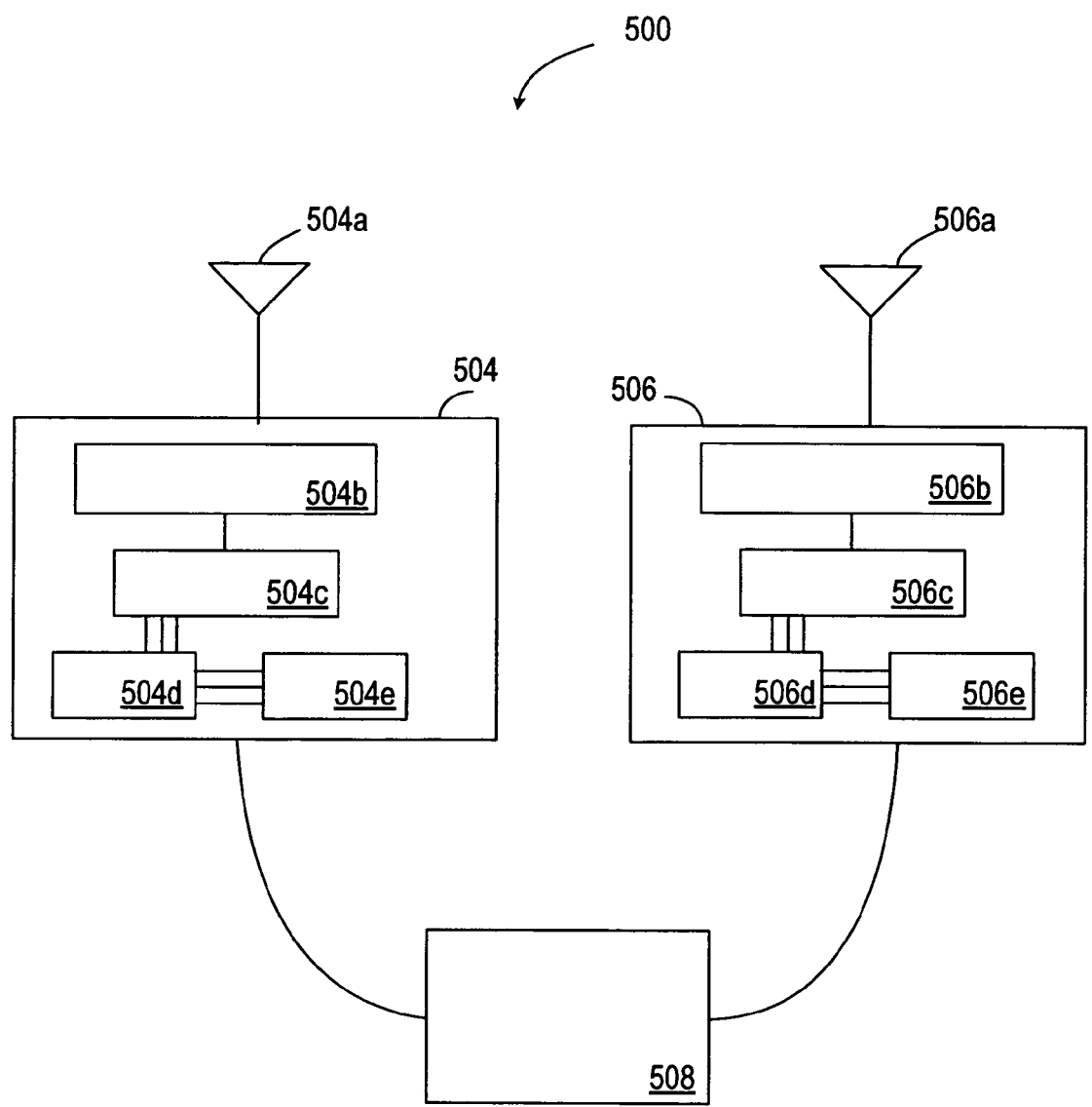
FIG. 5 is a high-level block diagram that illustrates a systems architecture with another type of complex RF section module in relation to a high-level receiver navigation processor, according to certain embodiments.

FIG. 5 is a high-level block diagram that illustrates a systems architecture with another type of complex RF section module in relation to a high-level receiver navigation processor, according to certain embodiments. FIG. 5 shows system 500 that comprises RF section modules 504 and 506, each of which is connected to high-level navigation processor 508. RF section module 504 is connected to an antenna 504a, and includes an RF section 504b, an Analog-to-Digital converter (A/D) 504c, a correlator 504d, and a central processing unit 504e. Similarly, RF section module 506 is connected to an antenna 506a, and includes an RF section 506b, an Analogto-Digital converter (A/D) 506c, a correlator 506d, and a central processing unit 506e. The Analog-to-Digital converter (A/D) converts the signals received the receiver to digital data that is passed to a correlator for correlating data. The correlator output is passed to the CPU, such as CPU 504e, for processing of the correlated data to produce phase output data. The phase output data is passed to the navigation processor for further processing. For purposes of simplicity, only two RF section modules and one processor are shown in FIG. 5. The number of RF section modules and processors may vary from implementation to implementation.

Techniques for combining the phase information from complementary RF modules can be divided into two categories:

1) Techniques that require all system components in need of the phase data to compensate for any non-traditional characteristics of the phase data from the modular design. Examples of such characteristics are rapid clock divergence and significantly non-collocated phase centers.
2) Techniques that attempt to create phase messages or differential corrections that are indistinguishable or that are functionally equivalent to messages output from a traditional multi-frequency receiver. Such phase messages, assuming that they adhere to legacy phase message standards, can be used in systems with hardware components running legacy firmware. Examples of phase message standards include open standards such as RTCM SC-104 and CMR, and proprietary phase messages used by different GNSS receiver manufacturers.

For the first category of techniques, any method that conveys the phase data or phase correction data along with any necessary other information such as the relative position of various antennas is adequate. The other system components can manipulate the phase data and other information after reception to compensate for any non-traditional characteristics of the modular design. For example, an L1/L5 RTK rover that is aware that the base station consists of an L1 receiver and antenna and an L5 receiver and antenna can receive L1-only phases from the L1-only receiver and L5-only phases from the L5-only receiver and can combine that information with the relative position between the antennas.

The second category of techniques may be required to compensate for antenna phase center offsets and/or clock divergence between RF modules before generating phase messages or differential corrections. In some cases, two mutually complementary RF modules may share an antenna that has frequency capabilities of the union of the RF modules (for example, an L1/L2 RF module and an L1/L5 RF module may share an L1/L2/L5 antenna). In such cases, no antenna phase center compensation is required. Similarly, sometimes two mutually complementary RF modules may share a common clock (one module may receive a clock signal from the other module, or they both receive clock signals from an external source). In such cases, no dynamic clock compensation between frequencies is required. In general, there are six cases to consider:

1) Common clock, common antenna
2) Independent clocks, common antenna
3) Common clock, independent antennas with a shared frequency
4) Independent clock, independent antennas with a shared frequency
5) Common clock, independent antennas with no shared frequency
6) Independent clock, independent antennas with no shared frequency For cases 3 through 6, the system needs to compensate for phase center offsets between the independent antennas before generating the phase messages or differential correction. If the antennas are static (for example, a permanent base station installation), the relative positions can be calibrated once and used thereafter to compensate for position offsets. Otherwise, a dynamic estimate of position needs to be derived. In cases 3 and 4, the relative position between the antennas can be calculated in real-time by using traditional carrier phase RTK processing techniques on the shared frequency. In cases 5 and 6, an independent estimate of the relative position may be used. For example, if the antennas are mounted on the same rigid body for which the orientation is known (based on inertial sensor, independent GPS attitude or other data), the relative position of the antennas can be calculated. Given the relative position between the antennas, the phases from one antenna can be projected to the other antenna location:

$$\phi' = \phi + \hat{e} \cdot \Delta \check{x}$$

Where:

$\phi'$ is the projected phase.

$\phi$ is the original phase $\hat{e}$ is a unit line of sight vector towards the satellite $\Delta \check{x}$ is the relative position vector Alternatively, the phases from each antenna can be projected to the same reference point using similar techniques.

For cases 2, 4, and 6, it may be necessary to compensate for the different clock offsets between RF modules. It should be noted that most RTK systems have some inherent robustness to slow common mode (affecting all satellites equally) carrier phase drift between frequencies. For example, an RTK system should be robust to the different rates of circular polarization windup observed as an antenna rotates. However, due to dynamic range considerations or other implementation-specific reasons, it is often undesirable to have a significant common-mode drift between frequencies. For example, the CMR phase correction standard expresses the L2 carrier phase as a scaled offset from the L1 code phase. If there is a significant drift between L1 and L2 phases, the offset will eventually exceed the dynamic range provided in the L2 offset field. Therefore, it is desirable to make at least a coarse correction for clock drift between RF modules. For case 2 (if the RF modules share a common frequency) and case 4 (after compensating for antenna offset), it is possible to measure the phase on a common frequency relative to each of the clocks to directly observe the clock drift. For case 2 (if the RF modules do not share a common frequency) and case 6, there is no common frequency to compare. However, if the phases from one frequency are scaled up or down to nominally match the phases from another frequency, any mismatch is mainly due clock drift and ionosphere drift between frequencies. In most cases, it is acceptable to ignore the ionosphere drift because it will not cause dynamic range problems. In such cases, one satellite or an average of several scaled satellite measurements can be used to estimate the clock drift between frequencies. If other considerations require a better estimate of clock drift than one corrupted by the ionosphere, an estimate of the ionosphere drift can be found several ways. For example, if there exists a dual frequency antenna connected to a dual frequency RF module in the system, traditional techniques can be used to calculate an ionosphere drift estimate that can be removed from the scaled phase measurements between different RF modules to provide an uncorrupted clock drift estimate. Alternatively, models of the ionosphere or wide area ionosphere corrections (such as from WAAS or Omnistar, for example) may be used to estimate the ionosphere. For case 1, no clock or antenna phase offset compensation is necessary.

In the foregoing specification, embodiments of the invention have been described with reference to numerous specific details that may vary from implementation to implementation. The specification and drawings are, accordingly, to be regarded in an illustrative rather than a restrictive sense. The invention is intended to be as broad as the appended claims, including all equivalents thereto.

What is claimed is:

1. A method for determining a position, said method comprising:
   a) providing a plurality of RF section modules in a system for defining said position; and
   b) combining phase measurement data from said plurality of RF section modules wherein:
      (i) at least one RF section module is removable from said system; and
      (ii) said at least one removable RF section module has a mutually complementary frequency set with respect to a frequency set of one or more other RF section modules in said system.

2. The method of claim 1, wherein said mutually complementary frequency set consists of at least one frequency selected from a set of frequencies provided by Galileo and GPS.

3. The method of claim 1, wherein said plurality of RF section modules have wired connections to each other, and wherein said at least one removable RF section module has its own separate enclosure.

4. The method of claim 3, wherein said mutually complementary frequency set comprises at least one of L1 and L5 frequencies.

5. The method of claim 3, wherein said mutually complementary frequency set comprises at least one of L1, L2, and L5 frequencies.

6. The method of claim 1, wherein combining phase measurement data further comprises merging, into a single stream of data, phase measurement data from two or more RF section modules of said plurality RF section modules, wherein said two or more RF section modules have mutually complementary frequency sets.

7. The method of claim 6, wherein said single stream of data comprises a combined phase message that includes said phase data from said two or more RF section modules that have mutually complementary frequency sets.

8. The method of claim 6, wherein said single stream of data comprises interleaved phase messages that include phase data from each of said two or more RF section modules that have mutually complementary frequency sets.

9. The method of claim 3, further comprising performing at least one down-conversion at least one RF section module of said plurality of RF section modules.

10. The method of claim 3, further comprising performing at least two down-conversions at an RF section module of said plurality of RF section modules.

11. The method of claim 9, further comprising using a clock that is common to multiple RF section modules for one or more of: down-conversions and sampling.

12. The method of claim 9, wherein said at least one removable RF section module uses a clock for one or more of: down-conversions and sampling, and wherein said clock is independent of another clock that is associated with a different RF section module in said system for defining said position.

13. The method of claim 12, wherein said combining phase measurement data from a plurality of RF section modules further comprises calculating an estimate of clock divergence.

14. The method of claim 13, wherein calculating said estimate of clock divergence further comprises compensating for antenna phase center offsets.

15. The method of claim 13, wherein at least two RF section modules share a common frequency and wherein calculating said estimate of clock divergence further comprises comparing satellite phase measurements at said common frequency.

16. The method of claim 13, wherein calculating said estimate of clock divergence further comprises scaling phase measurements at different frequencies and comparing said scaled phase measurements.

17. The method of claim 16, wherein calculating said estimate of clock divergence further comprises determining ionosphere divergence between two frequencies.

18. The method of claim 17, further comprising using an ionosphere divergence model for determining ionosphere divergence.

19. The method of claim 17, further comprising measuring ionosphere divergence for determining ionosphere divergence.

20. The method of claim 19, wherein said measuring ionosphere divergence further comprises using dual frequency measurements that are processed using a common clock.

21. The method of claim 20, wherein said dual frequency measurements are from an RF section module with dual frequencies.

22. The method of claim 20, wherein said dual frequency measurements are from one or more remote receivers.

23. The method of claim 22, wherein said one or more remote receivers are wide area base stations.

24. The method of claim 22, wherein said one or more remote receivers is another receiver in a local area and that has wireless data link connections to said system.

25. The method of claim 16, wherein calculating said estimate of clock divergence further comprises ignoring ionosphere divergence between two frequencies.

26. The method of claim 3, wherein said at least one removable RF section module is capable of use for position determination without other RF section modules.

27. The method of claim 26, wherein said at least one removable RF section module includes of any one of: a GPS receiver, a Galileo receiver and a GPS-Galileo receiver.

28. The method of claim 27, further comprising upgrading a differential GPS base station by adding frequency capability to said differential GPS base station by combining phase measurement data of said differential GPS base station with phase measurement data from said at least one removable RF section module.

29. The method of claim 26, wherein each of a plurality of removable RF section modules from said plurality of RF section modules includes any of: a GPS receiver, a Galileo receiver and a GPS-Galileo receiver.

30. The method of claim 29, further comprising upgrading a differential GPS base station by adding frequency capability to said differential GPS base station by combining phase measurement data of said differential GPS base station with phase measurement data from one or more of said plurality of removable RF section modules that have mutually complementary frequencies with respect to said differential GPS base station.

31. The method of claim 29, further comprising:
receiving phase measurements from a first receiver of said plurality of receivers by a second receiver of said plurality of receivers;
combining, by said second receiver, said received phase measurements with phase measurements generated by said second receiver to form a-combined set of phase measurements; and
outputting, by said second receiver, said combined set of phase measurements.

32. The method of claim 31, wherein said first receiver has L1 capability and said second receiver has L5 capability.

33. The method of claim 32, wherein said first receiver is an L1/L2 receiver.

34. The method of claim 32, wherein said first receiver is an L1 only receiver and said second receiver is an L5 only receiver.

35. The method of claim 33 wherein said second receiver is an L1/L5 receiver.

36. The method of claim 33 wherein said second receiver is an L5/E6 receiver.

37. The method of claim 33 wherein said second receiver is an L5/E5b receiver.

38. The method of claim 32, wherein said first receiver is an L1/L5 receiver and said second receiver is an L5/E6 receiver.

39. The method of claim 32, wherein said first receiver is an L1/L5 receiver and said second receiver is an L5/E5b receiver.

40. The method of claim 31, wherein said first receiver is a differential GPS base station.

41. The method of claim 40, wherein said second receiver initially lacks capability to combine phase measurements and wherein firmware of said second receiver is upgraded to support combining of phase measurements from said plurality of receivers.

42. The method of claim 3, wherein at least two RF section modules of said plurality of RF section modules are connected to a single antenna.

43. The method of claim 3, wherein at least two RF section modules of said plurality of RF section modules are connected to two different antennas.

44. The method of claim 43, wherein said combining phase measurements further comprises compensating for antenna phase center offset.

45. The method of claim 44, wherein said two different antennas share a common frequency, and further comprises calculating said antenna phase center offset using said common frequency.

46. The method of claim 44, wherein said compensating for antenna phase center offset assumes a fixed calibrated antenna phase center offset.

47. The method of claim 44, wherein said compensating for antenna phase center offset is performed without assuming a fixed calibrated phase center offset, and further comprises:
calculating at least one dimension of orientation in real time; and
using said calculated dimension of orientation for said compensating for antenna phase center offset.

48. The method of claim 9, wherein said at least one removable RF section module has no processor capable of supporting navigation processing for at least one antenna within said at least one removable RF section module.

49. The method of claim 48, further comprising outputting one or more intermediate frequency signals from one or more of said plurality of RF section modules.

50. The method of claim 48, wherein said separate enclosure of said at least one removable RF section module encloses an Analog-to-Digital converter for sampling down-converted signals.

51. The method of claim 50, wherein said separate enclosure of said at least one removable RF section module encloses a programmable logic or ASIC correlator that communicates through a wired bus with a processor, said processor being in another separate enclosure.

52. The method of claim 1, wherein an antenna and optionally an Analog-to-Digital converter and optionally a low-level processor are integrated into said at least one removable RF section module.

53. A system for determining a position, said system comprising:
a plurality of RF section modules, wherein said plurality of RF section modules includes at least one removable RF section module having a mutually complementary frequency set with respect to a frequency set of one or more other RF section modules in said system; and
a combining means for combining phase measurement data from said plurality of RF section modules.

54. The system of claim 53, wherein said mutually complementary frequency set consists of at least one frequency selected from a set of frequencies provided by Galileo and GPS.

55. The system of claim 53, wherein said plurality of RF section modules have wired connections to each other, and wherein said at least one removable RF section module has its own separate enclosure.

56. The system of claim 55, wherein said mutually complementary frequency set comprises at least one of L1 and L5 frequencies.

57. The system of claim 55, wherein said mutually complementary frequency set comprises at least one of L1, L2, and L5 frequencies.

58. The system of claim 53, wherein said combining means further comprises a merging means for merging, into a single stream of data, phase measurement data from two or more RF section modules of said plurality RF section modules, wherein said two or more RF section modules have mutually complementary frequency sets.

59. The system of claim 58, wherein said single stream of data comprises a combined phase message that includes said phase data from said two or more RF section modules that have mutually complementary frequency sets.

60. The system of claim 58, wherein said single stream of data comprises interleaved phase messages that include phase data from each of said two or more RF section modules that have mutually complementary frequency sets.

61. The system of claim 55, further comprising a down-converter for performing at least one down-conversion at least one RF section module of said plurality of RF section modules.

62. The system of claim 55, further comprising a down-converter for performing at least two down-conversions at an RF section module of said plurality of RF section modules.

63. The system of claim 61, further comprising a clock that is common to multiple RF section modules for one or more of: performing down-conversions and sampling.

64. The system of claim 53, wherein said at least one removable RF section module uses a clock for one or more of: performing down-conversions and sampling, and wherein said clock is independent of another clock that is associated with a different RF section module in said system.

65. The system of claim 64, wherein said combining phase measurement data from a plurality of RF section modules further comprises an estimate of clock divergence.

66. The system of claim 65, wherein said estimate of clock divergence further comprises a compensation for antenna phase center offsets.

67. The system of claim 65, wherein at least two RF section modules share a common frequency and wherein said estimate of clock divergence further comprises a comparison of satellite phase measurements at said common frequency.

68. The system of claim 65, wherein said estimate of clock divergence further comprises a scaling of phase measurements at different frequencies and a comparison of said scaled phase measurements.

69. The system of claim 68, wherein said estimate of clock divergence further comprises ignoring ionosphere divergence between two frequencies.

70. The system of claim 55, wherein said at least one removable RF section module is capable of use for position determination without other RF section modules.

71. The system of claim 70, wherein said at least one removable RF section module includes any one of: a GPS receiver, a Galileo receiver and a GPS-Galileo receiver.

72. The system of claim 71, further comprising a differential GPS base station that is upgraded by adding frequency capability to said differential GPS base station by combining phase measurement data of said differential GPS base station with phase measurement data from said at least one removable RF section module.

73. The system of claim 70, wherein each of a plurality of removable RF section modules from said plurality of RF section modules include any of a GPS receiver, a Galileo receiver and a GPS-Galileo receiver.

74. The system of claim 73, further comprising a differential GPS base station that is upgraded by adding frequency capability to said differential GPS base station by combining phase measurement data of said differential GPS base station with phase measurement data from one or more of said plurality of removable RF section modules that have mutually complementary frequencies with respect to said differential GPS base station.

75. The system of claim 73, further comprising:
a first receiver of said plurality of receivers; and
a second receiver of said plurality of receivers;
said first receiver sending phase measurements to said second receiver;
wherein said second receiver combines said received phase measurements with phase measurements generated by said second receiver to form a combined set of phase measurements and said second receiver outputs said combined set of phase measurements.

76. The system of claim 75, wherein said first receiver has L1 capability and said second receiver has L5 capability.

77. The system of claim 76, wherein said first receiver is an L1/L2 receiver.

78. The system of claim 76, wherein said first receiver is an L1 only receiver and said second receiver is an L5 only receiver.

79. The system of claim 77 wherein said second receiver is an L1/L5 receiver.

80. The system of claim 77 wherein said second receiver is an L5/E6 receiver.

81. The system of claim 77 wherein said second receiver is an L5/E6b receiver.

82. The system of claim 76, wherein said first receiver is an L1/L5 receiver and said second receiver is an L5/E6 receiver.

83. The system of claim 76, wherein said first receiver is an L1/L5 receiver and said second receiver is an L5/E6b receiver.

84. The system of claim 75, wherein said first receiver is a differential GPS base station.

85. The system of claim 84, wherein said second receiver initially lacks capability to combine phase measurements and wherein firmware of said second receiver is upgraded to support combining of phase measurements from said plurality of receivers.

86. The system of claim 55, wherein at least two RF section modules of said plurality of RF section modules are connected to a single antenna.

87. The system of claim 55, wherein at least two RF section modules of said plurality of RF section modules are connected to two different antennas.

88. The system of claim 87, wherein said combining phase measurements further comprises a compensation for antenna phase center offset.

89. The system of claim 88, wherein said two different antennas share a common frequency, and further comprises a calculation of said antenna phase center offset using said common frequency.

90. The system of claim 88, wherein said compensation for antenna phase center offset assumes a fixed calibrated phase center offset.

91. The system of claim 88, wherein said compensation for antenna phase center offset is performed without assuming a fixed calibrated phase center offset, and further comprises:
a calculation of at least one dimension of orientation in real time; and
using said calculation of at least one dimension of orientation for said compensating for antenna phase center offset.

92. The system of claim 61, wherein said at least one removable RF section module has no processor capable of supporting navigation processing, for at least one antenna, within said at least one removable RF section module.

93. The system of claim 92, wherein one or more of said plurality of RF section modules outputs one or more intermediate frequency signals.

94. The system of claim 92, wherein said separate enclosure of said at least one removable RF section module encloses an Analog-to-Digital converter for sampling down-converted signals.

95. The system of claim 94, wherein said separate enclosure of said at least one removable RF section module encloses a programmable logic or ASIC correlator that communicates through a wired bus with a processor, said processor being in another separate enclosure.

96. The system of claim 53, wherein an antenna and optionally an Analog-to-Digital converter and optionally a low-level processor are integrated into said at least one removable RF section module.

* * * * *